UNITED STATES PATENT OFFICE.

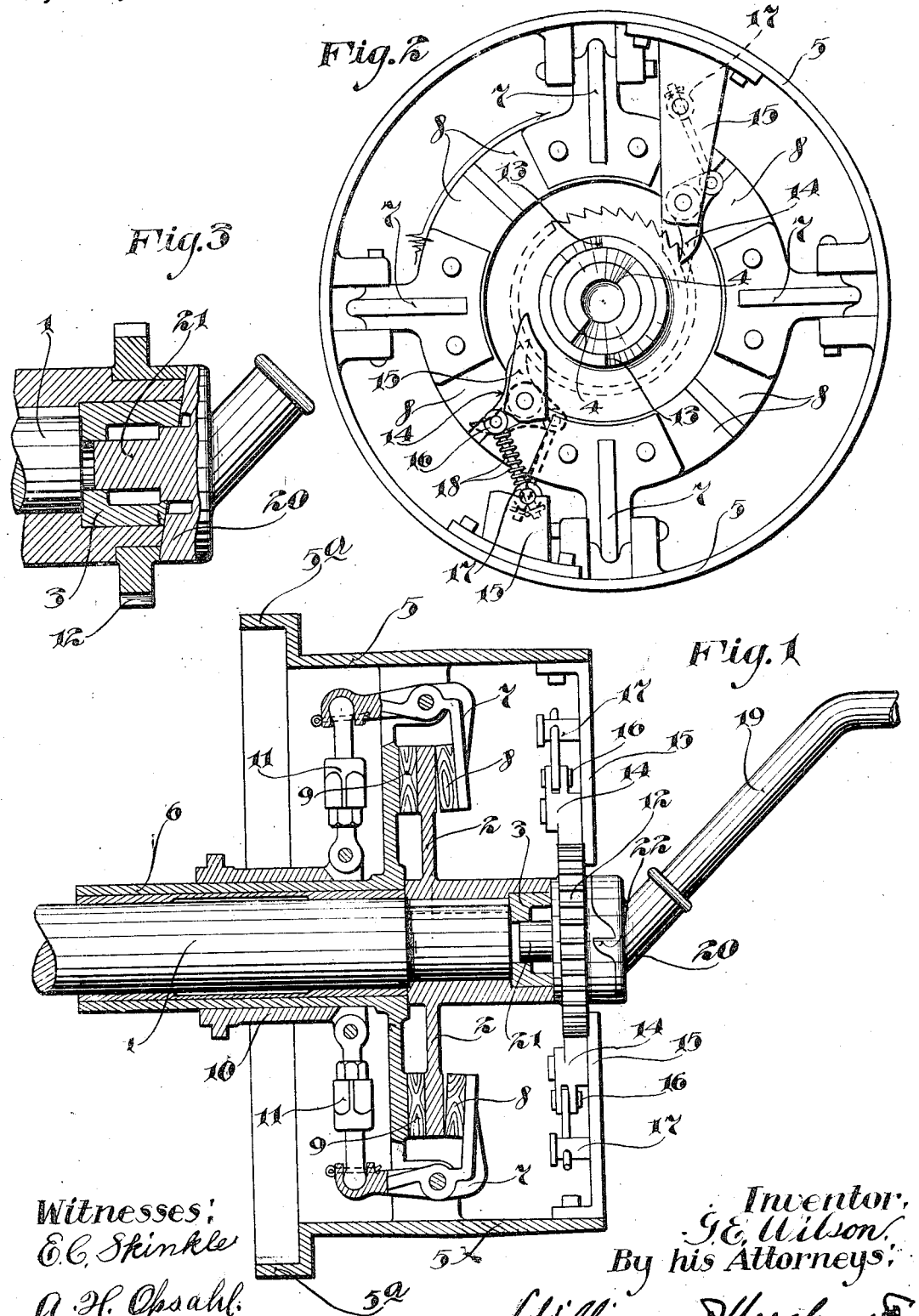

GEORGE E. WILSON, OF STILLWATER, MINNESOTA, ASSIGNOR TO M. RUMELY COMPANY, OF LAPORTE, INDIANA, A CORPORATION OF INDIANA.

COMBINED SAFETY CRANKING DEVICE, CLUTCH, AND PULLEY FOR EXPLOSIVE-ENGINES.

1,069,751.

Specification of Letters Patent.

Patented Aug. 12, 1913.

Application filed October 13, 1911. Serial No. 654,494.

*To all whom it may concern:*

Be it known that I, GEORGE E. WILSON, a citizen of the United States, residing at Stillwater, in the county of Washington and State of Minnesota, have invented certain new and useful Improvements in Combined Safety Cranking Devices, Clutches, and Pulleys for Explosive-Engines; and I do hereby declare the following to be a full, clear, and exact description of the invention, such as will enable others skilled in the art to which it appertains to make and use the same.

My invention has for its object to provide a simple and efficient combined safety cranking device, clutch and pulley for use in connection with explosive engines, and especially adapted for use in connection with the explosive engines of gasolene or oil tractors.

To the above ends, generally stated, the invention consists of the novel devices and combinations of devices hereinafter described and defined in the claims.

The invention is illustrated in the accompanying drawings wherein like characters indicate like parts throughout the several views.

Referring to the drawings, Figure 1 is a view in horizontal section showing the improved device; Fig. 2 is a side elevation showing the improved pulley clutch and safety cranking device, some parts being broken away; and Fig. 3 is a detail partly in vertical section and partly in full elevation showing the starting crank applied to the crank shaft and crank tripping clutches.

In the preferred construction illustrated, the engine crank shaft 1 is keyed, or has otherwise rigidly secured to one end, a friction clutch disk 2 having a projecting hub in which a bushing 3 is rigidly secured. The outer end of the said hub and bushing are formed with ratchet teeth 4, preferably two in number located diametrically at opposite points. A pulley 5 is provided with a long sleeve-like hub 6 mounted to rotate on the shaft 1. Clutch levers 7 are intermediately pivoted in the openings formed in the web of the pulley 5 and provided with brake shoes 8 adapted to press the disk 2 against brake shoes 9 secured on the face of the web of the said pulley. A shipper sleeve 10 is mounted to slide upon but to rotate with the pulley hub 6, and this sleeve is connected by links 11 to the adjacent ends of the clutch lever 7. The usual or any suitable means may be provided for imparting sliding movements to the shipper lever 10 to thereby operate the levers 7 and connect the pulley 5 to the shaft 1 and to release the same therefrom, at will.

Loosely journaled on the reduced outer end portion of the disk hub 2 is a tripping ratchet wheel 12 which, in its outwardly projecting hub is formed with diametrically opposite ratchet teeth 13 that are adapted to be alined with the ratchet teeth 4, already noted. Normally, the teeth of the ratchet wheel 12 are engaged by one or more retaining pawls 14 which, as shown, are pivoted to inwardly projecting arms 15 rigidly secured to the rim of the pulley 5. As a preferred arrangement for yieldingly holding the retaining pawls 14, small bolts 16 are pivoted thereto and are arranged to slide through reaction blocks 17 that are pivoted to the respective arms 15. Coiled springs 18 are placed on the bolts 16 and compressed between said pawls and reaction blocks 17. When the pawls are set by hand, as shown in full lines in Fig. 2, they are yieldingly held for engagement with the teeth of the ratchet wheel 12, but when moved by hand into an extreme position shown by dotted lines in Fig. 2, they will be spring held in inoperative positions, so that noise will not be produced when the engine crank shaft is driven while the pulley 5 remains stationary.

The starting crank 19 is provided with a head 20 formed with axially projecting centering pin 21 and with diametrically opposing ratchet teeth 22. The centering pin 21 is shown as formed with sections of relatively large and small diameter to fit the large and small end portions of the bushings 3, but this specific construction, as well as the use of the bushings are only matters of detail, the said bushings being used as a convenience in construction. The ratchet teeth 4 are also formed in the end of the disk hub 2 and in the bushings 3, as a matter of preference, but in effect, and from a broad point of view, the said ratchet teeth are formed on a part of the crank shaft 1. Preferably, the pulley 5 is provided at its inner edge with an enlarged guard flange 5ᵃ to prevent the sleeve of an operator, for example, from being caught by the clutch lever 7 or links 11.

When the starting crank is applied in working position as shown in Figs. 1 and 3, its ratchet teeth 22 are engaged with the crank shaft ratchet teeth 4 and with the teeth 13 of the gripping ratchet 12, which teeth 4 and 13 are then alined radially. When the engine is to be cranked, the clutch is open so as to permit the pulley 5 to stand still. If the driving belt happens to be on the pulley at such time, so much the better. The engine is cranked by rotation of its shaft in direction of the arrow marked on Fig. 2, and if the belt is not on the pulley, the pulley will probably be given more or less movement in the same direction, by friction in the journal, but it may sometimes remain approximately stationary. In the cranking action, the ratchet wheel 12 moves with the crank shaft, but if the crank shaft be given a reverse movement by a back explosion, the pawls 14 will hold the ratchet wheel against such backward movement and its ratchet or clutch teeth 13 will then act as cams on the teeth 22 of the starting crank, and will instantly force the said teeth 22 out of engagement with the teeth 4 and 13 and thus disconnect the said starting crank from the crank shaft. This, as is evident, will effectually prevent breaking of arms, or other accidents such as frequently occur when a back explosion takes place in cranking the engine. It is also important to note that the length of the centering pin 21 of the starting crank is such in respect to its seats in the bushing 3 that the said pin will be forced out of engagement with the said seats when the ratchet or clutch teeth 4, 13, and 22 are disengaged, as above described. This is important because it causes the starting crank to drop out of engagement with its seat in the engine crank shaft, and hence prevents accidental reëngagement of the said clutch teeth following an initial backward movement due to a back explosion.

In the crank releasing action above described, the force required to overcome the inertia of the pulley is such that it holds the ratchet wheel 12 either stationary or drags backward thereon so that the releasing action takes place as stated. When the belt is on the pulley, the said pulley will, of course, remain absolutely stationary.

The expression "relatively stationary" as applied to the pulley, is herein used in a liberal sense, to mean that the said pulley either stands still or drags backward with sufficient force to release the starting crank from the coöperating clutch members. The so-called engine crank shaft may be an integral part of the engine crank shaft proper or it may be a shaft coupled thereto in any suitable way and driven thereby.

The elements 4, 13 and 22 herein specifically referred to as ratchet teeth, constitute coöperating half clutches which are adapted to be engaged and disengaged, as above described.

What I claim is:

1. The combination with a crank shaft, a pulley and a clutch for connecting and disconnecting said shaft and pulley, said shaft having a crank engaging member, of a starting crank detachably engageable with the crank engaging member of said shaft, said pulley adapted to remain relatively stationary with respect to said shaft during cranking and when said clutch is disengaged, and a crank releasing device having a base of reaction against said pulley and operative to release said crank from the crank engaging member of said shaft when said shaft is rotated backward in respect to said pulley.

2. The combination with a crank shaft, a pulley thereon and a clutch for connecting and disconnecting said shaft and pulley, said shaft having a crank engaging half clutch, of a starting crank having a half clutch detachably engageable with the half clutch of said shaft, by lateral movements longitudinally of said shaft, said pulley adapted to remain relatively stationary with respect to said shaft during cranking and when said clutch is disengaged, and a crank releasing device operative to disconnect said starting crank from said shaft, when said shaft is rotated backward in respect to said pulley.

3. The combination with a crank shaft, a pulley loose on said shaft, and a clutch for connecting and disconnecting said shaft and pulley, at will, a starting crank having a half clutch, a ratchet wheel loose in respect to said pulley and shaft, said ratchet wheel and shaft having crank engaging half clutches adapted to be in position for engagement with a half clutch of said starting crank, and a yielding pawl on said pulley operative on said ratchet wheel to retard backward movement thereof and thereby release said crank, when said shaft is rotated backward in respect to said pulley.

4. The combination with a crank shaft, a pulley loose thereon, and a clutch for connecting and disconnecting the two at will, of a ratchet wheel loose in respect to said shaft and pulley but axially alined therewith, a starting crank having a half clutch, half clutches on said ratchet wheel and on said crank shaft adapted to be positioned for engagement with the half clutch of said starting crank in the starting action, and a yielding pawl on said pulley operative on the teeth of said ratchet wheel to retard movement thereof and release said crank, when said engine shaft is given an initial backward movement.

5. The combination with a crank shaft, a pulley loose thereon, and a clutch for connecting and disconnecting the two at will, of a ratchet wheel loose in respect to said shaft and pulley but axially alined therewith, a starting crank having a half clutch, half clutches on said ratchet wheel and on said crank shaft adapted to be positioned for engagement with the half clutch of said starting crank in the starting action, and a yielding pawl on said pulley operative on the teeth of said ratchet wheel to retard movement thereof and release said crank, when said engine shaft is given an initial backward movement, the said starting crank having a centering pin engageable with a seat in said crank shaft and of such length that it will be disengaged from its seat when the above noted half clutches are disengaged.

In testimony whereof I affix my signature in presence of two witnesses.

GEORGE E. WILSON.

Witnesses:
BERNICE G. WHEELER,
HARRY D. KILGORE.

Copies of this patent may be obtained for five cents each, by addressing the "Commissioner of Patents, Washington, D. C."